(12) United States Patent
Hsu

(10) Patent No.: US 8,345,360 B2
(45) Date of Patent: Jan. 1, 2013

(54) CAMERA UNIT AND MACRO LENS THEREOF

(75) Inventor: Yun-Chiang Hsu, Taoyuan County (TW)

(73) Assignees: Visera Technologies Company Limited, Hsinchu (TW); Omnivision Technologies, Inc., Santa Clara, CA (US)

( * ) Notice: Subject to any disclaimer, the term of this patent is extended or adjusted under 35 U.S.C. 154(b) by 77 days.

(21) Appl. No.: 13/152,656

(22) Filed: Jun. 3, 2011

(65) Prior Publication Data
US 2012/0307381 A1    Dec. 6, 2012

(51) Int. Cl.
*G02B 9/00* (2006.01)

(52) U.S. Cl. ......................................... 359/796

(58) Field of Classification Search .................. 359/642, 359/796, 797
See application file for complete search history.

(56) References Cited

U.S. PATENT DOCUMENTS 7,841,785 B2 * 11/2010 Hirao et al. .................... 396/439
2007/0097523 A1 * 5/2007 Yamagata et al. ............. 359/797

* cited by examiner

*Primary Examiner* — Darryl J Collins
(74) *Attorney, Agent, or Firm* — Muncy, Geissler, Olds & Lowe, PLLC

(57) ABSTRACT

A camera unit is provided, including a camera lens and a macro lens coupled with the camera lens module along an optical axis. The macro lens comprises a plane substrate and a plano-convex lens structure formed on the plane substrate by wafer level processing, wherein the effective focal length of the macro lens is between 80-150 mm.

17 Claims, 4 Drawing Sheets

CAMERA UNIT AND MACRO LENS THEREOF

BACKGROUND OF THE INVENTION

1. Field of the Invention

This application relates in general to a camera unit and in particular to a camera unit having a camera lens and a macro lens optionally coupled with the camera lens.

2. Description of the Related Art

Conventional portable cell telephones or smart phones may comprise a built-in digital camera. The digital camera is usually used for landscape or portrait photography, but cannot provide good resolving power and contrast for close-up photography. In the recent years, some close-up lenses have been developed for the cell phone cameras, so that the cell phones can be used as a scanner for reading barcode or QR code. However, design of the close-up lens has become very difficult, as cell telephones are being designed more thin and compact.

BRIEF SUMMARY OF INVENTION

An object of the application is to provide a camera unit, including a camera lens and a macro lens coupled with the camera lens module along an optical axis. The macro lens comprises a plane substrate and a plano-convex lens structure formed on the plane substrate by wafer level processing, wherein the effective focal length of the macro lens is between 80-150 mm.

BRIEF DESCRIPTION OF DRAWINGS

The invention can be more fully understood by reading the subsequent detailed description and examples with references made to the accompanying drawings, wherein.

DETAILED DESCRIPTION OF INVENTION

Figure 1:
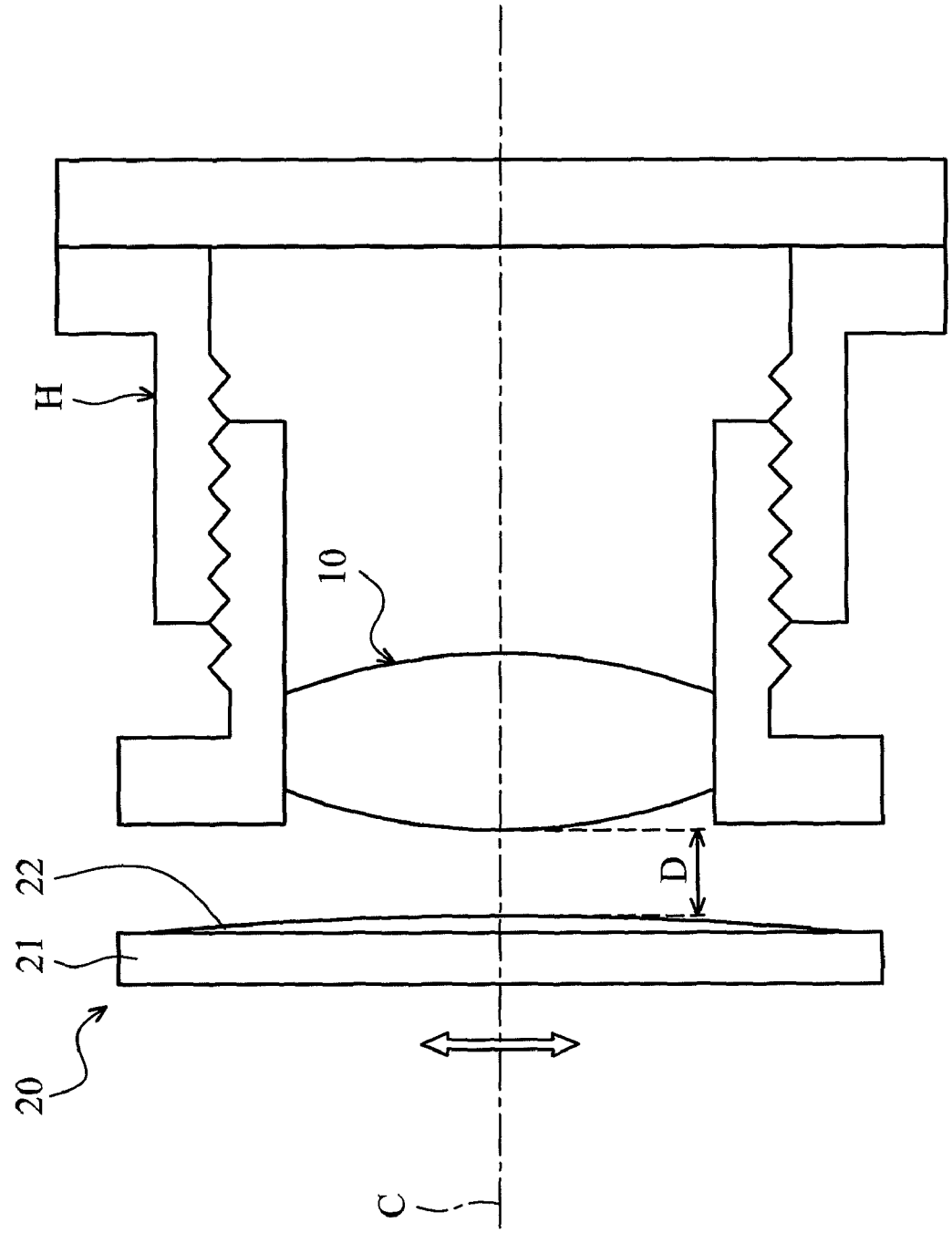
FIG. 1 is a perspective diagram of a camera unit according to an embodiment of the invention.

Referring to FIG. 1, an embodiment of a camera unit is disposed on an electronic device, primarily comprising a camera lens 10 and a movable macro lens 20. As shown in FIG. 1, the camera lens 10 is mounted to a housing H of the electronic device, and the macro lens 20 is movable with respect to the camera lens 10. Specifically, the macro lens 20 can be coupled with the camera lens 10 along an optical axis C for close-up photography and 2-dimensional (2D) barcode scanning. In some exemplary embodiments, the electronic device may be a cell telephone, smart phone, PDA and so forth.

As the arrows indicated in FIG. 1, the macro lens 20 is movable along a direction substantially perpendicular to the optical axis C. When the camera unit is in a normal mode, the macro lens 20 is away from the camera lens 10, and the focusing range of the camera unit is about 50 cm to infinity. Additionally, the macro lens 20 may slide to the optical axis C and couple with the camera lens 10 for close-up photography or 2D barcode scanning at a short distance, as the camera unit shown in FIG. 1.

Figure 2:
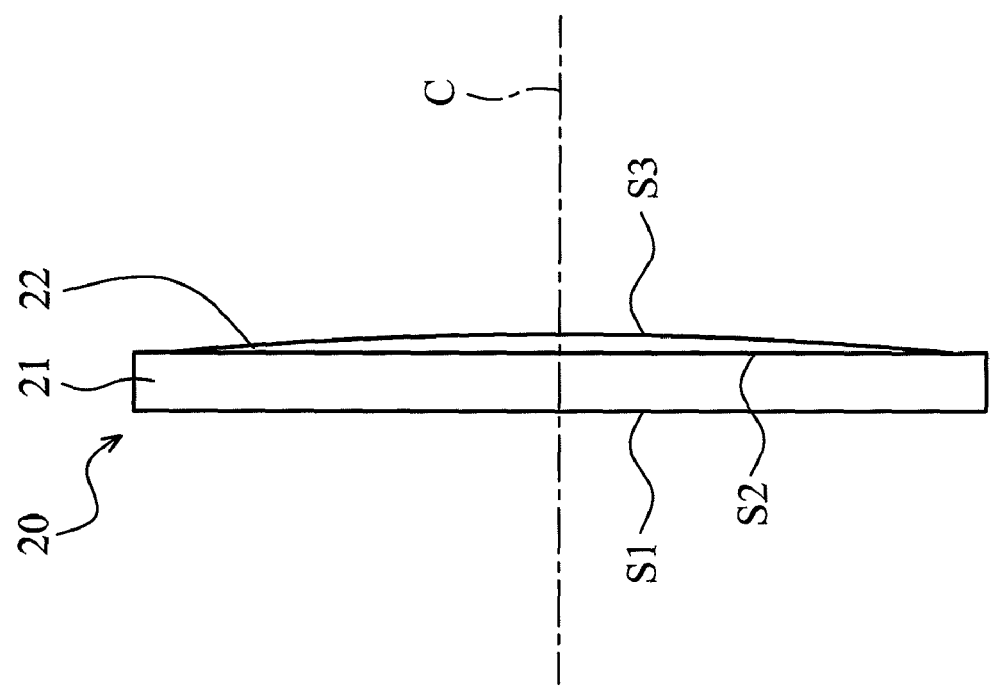
FIG. 2 is a perspective diagram of a macro lens according to an embodiment of the invention.

Referring to FIGS. 1 and 2, the compound macro lens 20 primarily comprises a plane substrate 21 and a plano-convex lens structure 22 formed on the plane substrate 21 by wafer level processing. In some embodiments, the plane substrate 21 may comprise glass, and the plano-convex lens structure 22 may comprise UV curable material laminated with the plane substrate 21.

The plano-convex lens structure 22 of the macro lens 20 further complies with the following conditions (1.1), (1.2), (1.3), and (1.4):

$$80 \text{ mm} < EFL < 150 \text{ mm} \quad (1.1)$$

$$0.01 < T/CA < 0.05 \quad (1.2)$$

$$T < 35 \text{ um} \quad (1.3)$$

$$200 \text{ um} < D < 1000 \text{ um} \quad (1.4)$$

With respect to the conditions (1.1), (1.2), (1.3), and (1.4) EFL represents the effective focal length of the macro lens 20. T represents a differential value between the center thickness and the edge thickness of the plano-convex lens structure 22. Generally, the center and edge thicknesses represent the thicknesses at the center and the edge of the lens structure along a direction parallel to an optical axis. CA represents the clear aperture of the plano-convex lens structure 22. D represents the distance between the camera lens 10 and the macro lens 20, as well as the distance D indicated in FIG. 1.

In this embodiment, the effective focal length of the compound macro lens 20 is 108 mm. The differential value T between the center thickness and the edge thickness of the plano-convex lens structure 22 is 20 um, and the clear aperture CA of the plano-convex lens structure 22 is 1530 um. The distance between the camera lens 10 and the macro lens 20 is 600 um.

Table 1-1 and 1-2 illustrate the detailed design parameters of the macro lens 20 in FIG. 2. Referring to tables 1-1, 1-2 and FIGS. 1-2, the plano-convex lens structure 22 has a convex surface S3 facing the camera lens 10, wherein the convex surface S3 is an aspheric surface. In some embodiments, the convex surface S3 may also be a sphere surface.

TABLE 1-1

| Surface | Radius of Curvature | Distance (mm) | Refractivity | Abbe Number |
|---|---|---|---|---|
| S1 | inf | 0.4 | 1.516 | 62.6 |
| S2 | inf | 0.06 | 1.52 | 49.5 |
| S3 | −56.3846991121005 | | | |

TABLE 1-2

| | Aspheric Coefficiencies | | | | | | | |
|---|---|---|---|---|---|---|---|---|
| Surface | K | A4 | A6 | A8 | A10 | A12 | A14 | A16 |
| S3 | | 0.000452885949949858 | 0.000389717539262169 | −0.000219549341773529 | | | | |

Figure 3:
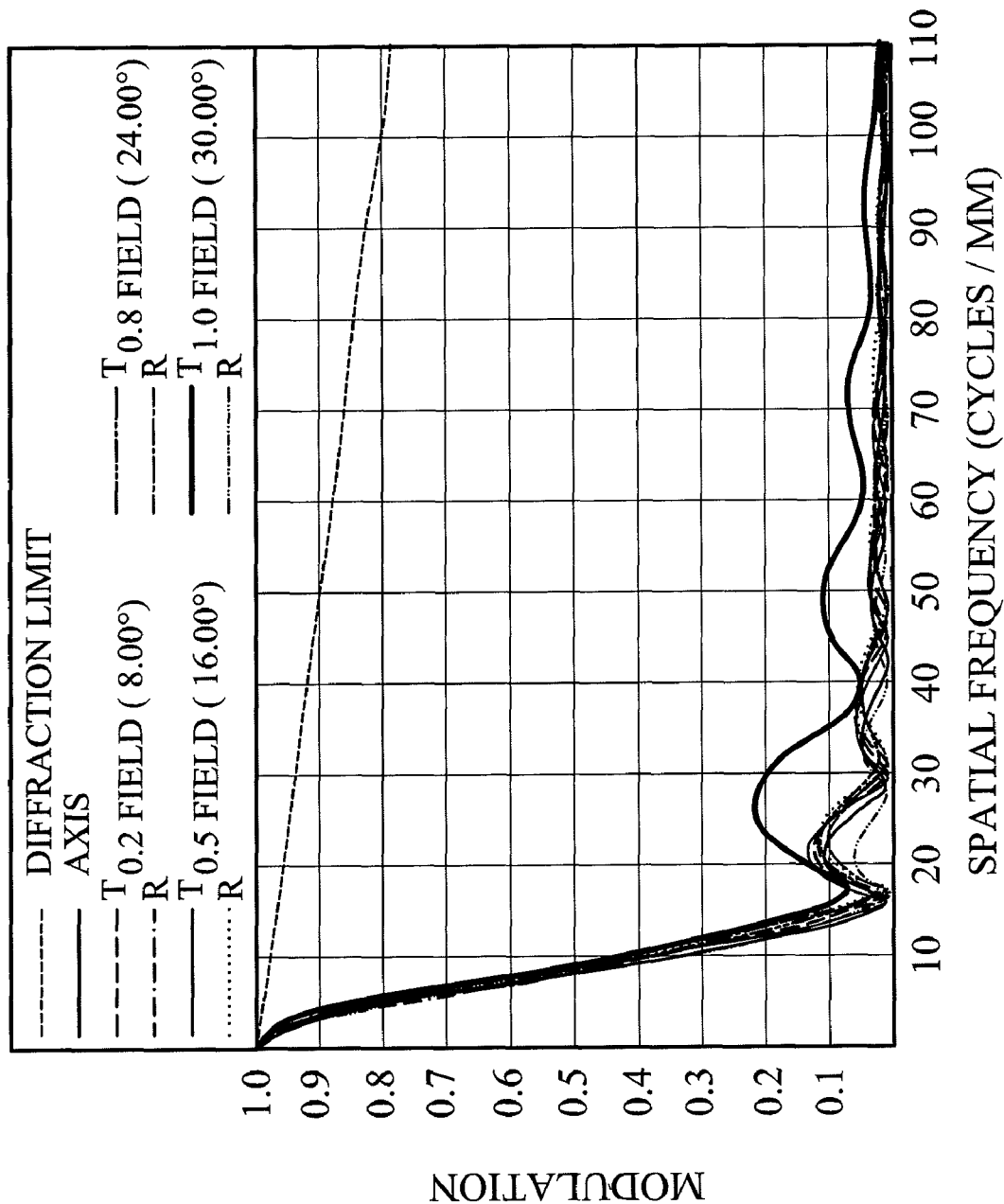
FIG. 3 is a Modulation Transfer Function (MTF) diagram showing several spatial frequency response curves in accordance with only the camera lens of the camera unit in FIG. 1 at a short object distance of 90 mm, wherein the macro lens is away from the optical axis and not coupled with the camera lens.

FIG. 3 is a Modulation Transfer Function (MTF) diagram showing several spatial frequency response curves in accordance with only the camera lens 10 of the camera unit in FIG. 1 at a short object distance of 90 mm, wherein the macro lens 20 is away from the optical axis C and not coupled with the camera lens 10. Referring to FIG. 3, the modulation value in the MTF diagram is substantially below 0.4 when the spatial frequency exceeds 10 cycles/mm. This denotes that the camera lens 10 cannot provide good resolving power and contrast for close-up photography.

Figure 4:
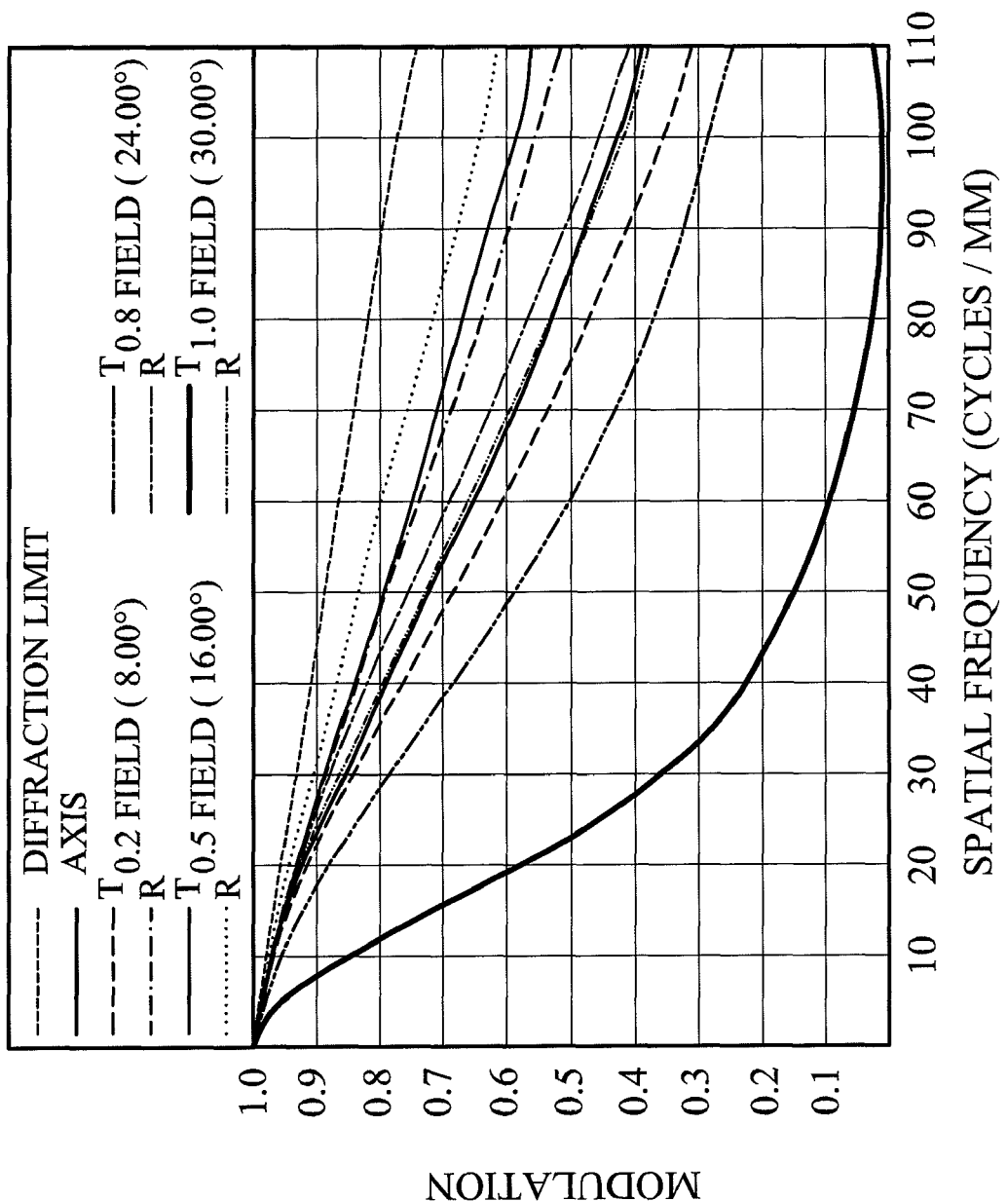
FIG. 4 is a Modulation Transfer Function (MTF) diagram showing several spatial frequency response curves in accordance with the camera unit in FIG. 1 at a short object distance of 90 mm, wherein the macro lens is coupled with the camera lens.

FIG. 4 is a Modulation Transfer Function (MTF) diagram showing several spatial frequency response curves in accordance with the camera unit in FIG. 1 at a short object distance of 90 mm, wherein the macro lens 20 is coupled with the camera lens 10. Referring to FIG. 4, the modulation value in the MTF diagram substantially exceeds 0.4 until the spatial frequency increased to approximately 80 cycles/mm. This denotes that the camera unit can provide good resolving power and contrast for close-up photography when the macro lens 20 is optically coupled with the camera lens 10. Since the macro lens 20 is movable with respect to the camera lens 10 and can be optionally coupled with the camera lens 10 for close-up photography or 2D barcode scanning, efficiency and convenience of usage are therefore improved.

The invention provides a camera unit of an electronic device, comprising a camera lens and a movable macro lens. The macro lens can be optically coupled with the camera lens for close-up photography or 2D barcode scanning. As the macro lens can have small dimensions and enhance resolving power and contrast of the camera unit at a short object distance less than 10 cm, it can be widely applied in various portable electronic devices.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation to encompass all such modifications and similar arrangements.

What is claimed is:

1. A macro lens, comprising:
   a plane substrate; and
   a plano-convex lens structure formed on the plane substrate by wafer level processing, wherein the effective focal length of the macro lens is between 80-150 mm.

2. The macro lens as claimed in claim 1, wherein the plano-convex lens structure has a clear aperture CA and a differential value T between a center thickness and a edge thickness of the plano-convex lens, and wherein 0.01<T/CA<0.05.

3. The macro lens as claimed in claim 2, wherein the differential value T is less than 35 um.

4. The macro lens as claimed in claim 1, wherein the plano-convex lens structure has a sphere convex surface.

5. The macro lens as claimed in claim 1, wherein the plano-convex lens structure has an aspheric convex surface.

6. The macro lens as claimed in claim 1, wherein the plano-convex lens structure comprises UV curable material.

7. The macro lens as claimed in claim 1, wherein the plane substrate comprises glass.

8. A camera unit, comprising:
   a camera lens; and
   a macro lens coupled with the camera lens module along an optical axis, comprising a plane substrate and a plano-convex lens structure formed on the plane substrate by wafer level processing, wherein the effective focal length of the macro lens is between 80-150 mm.

9. The camera unit as claimed in claim 8, wherein the plano-convex lens structure has a clear aperture CA and a differential value T between a center thickness and a edge thickness thereof, and wherein 0.01<T/CA<0.05.

10. The camera unit as claimed in claim 9, wherein the differential value T is less than 35 um.

11. The camera unit as claimed in claim 8, wherein the plano-convex lens structure has a sphere convex surface facing the camera lens.

12. The camera unit as claimed in claim 8, wherein the plano-convex lens structure has an aspheric convex surface facing the camera lens.

13. The camera unit as claimed in claim 8, wherein the plano-convex lens structure comprises UV curable material.

14. The camera unit as claimed in claim 8, wherein the plane substrate comprises glass.

15. The camera unit as claimed in claim 8, wherein the macro lens and the camera lens has a distance between 200-1000 um.

16. The camera unit as claimed in claim 8, wherein the macro lens is movable with respect to the camera lens along a direction substantially perpendicular to the optical axis.

17. A camera unit, comprising:
    a camera lens; and
    a macro lens coupled with the camera lens module along an optical axis, comprising a plane substrate and a plano-convex lens structure formed on the plane substrate by wafer level processing, wherein the macro lens and the camera lens has a distance between 200-1000 um.

* * * * *